(12) United States Patent
Kweon

(10) Patent No.: US 12,726,814 B2
(45) Date of Patent: Sep. 1, 2026

(54) METHOD AND DEVICE FOR CONTROL PLANE-BASED REGISTRATION AND REMOTE PROVISIONING IN COMMUNICATION SYSTEM

(71) Applicant: Samsung Electronics Co., Ltd., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 18/066,165

(22) Filed: Dec. 14, 2022

(65) Prior Publication Data

US 2023/0199484 A1 Jun. 22, 2023

(30) Foreign Application Priority Data

Dec. 22, 2021 (KR) ........................ 10-2021-0185215

(51) Int. Cl.

| | |
|---|---|
| ***H04M 1/66*** | (2006.01) |
| ***H04W 8/20*** | (2009.01) |
| ***H04W 12/043*** | (2021.01) |
| *H04W 12/71* | (2021.01) |
| *H04W 12/72* | (2021.01) |

(52) U.S. Cl.

CPC ........... *H04W 12/043* (2021.01); *H04W 8/20* (2013.01); *H04W 12/71* (2021.01); *H04W 12/72* (2021.01)

(58) Field of Classification Search

CPC ....... H04W 12/06; H04W 12/72; H04W 8/18; H04W 8/20; H04W 60/00

See application file for complete search history.

(56) References Cited

U.S. PATENT DOCUMENTS

| | | | | |
|---|---|---|---|---|
| 2020/0275279 | A1* | 8/2020 | Tangudu | H04W 12/068 |
| 2020/0396673 | A1* | 12/2020 | Tiwari | H04W 12/06 |
| 2021/0058784 | A1 | 2/2021 | Kedalagudde et al. | |
| 2021/0105712 | A1 | 4/2021 | Speicher et al. | |
| 2022/0104009 | A1* | 3/2022 | Baskaran | H04W 12/72 |
| 2022/0116777 | A1* | 4/2022 | Phan | H04W 12/041 |
| 2022/0182822 | A1* | 6/2022 | Ma | H04W 12/06 |

(Continued)

FOREIGN PATENT DOCUMENTS

WO 2021229474 A1 11/2021

OTHER PUBLICATIONS

International Search Report and Written Opinion of the International Searching Authority dated Mar. 20, 2023, in connection with International Application No. PCT/KR2022/020702, 8 pages.

(Continued)

*Primary Examiner* — Shantell L Heiber

(57) ABSTRACT

The disclosure relates to a 5G or 6G communication system for supporting a higher data transmission rate. An operation method of an access and mobility management function (AMF) in a wireless communication network according to the disclosure includes: receiving, from a base station, a registration request message including a parameter indicating that a terminal supports control plane-based remote provisioning; determining the control plane-based remote provisioning, based on the parameter; and determining an authentication server function (AUSF) for onboarding of the terminal, based on the control plane-based remote provisioning.

16 Claims, 14 Drawing Sheets

(56) References Cited

U.S. PATENT DOCUMENTS

| | | | | |
|---|---|---|---|---|
| 2022/0330022 | A1* | 10/2022 | Kolekar | H04W 12/71 |
| 2022/0345894 | A1* | 10/2022 | Aghili | H04W 4/70 |
| 2023/0137814 | A1* | 5/2023 | Staufer | H04W 12/06<br>455/411 |
| 2023/0171603 | A1* | 6/2023 | Garcia Martin | H04W 12/06<br>455/410 |
| 2023/0300596 | A1* | 9/2023 | Salmela | H04W 8/18<br>455/410 |
| 2023/0388797 | A1* | 11/2023 | Tiwari | H04W 36/142 |
| 2024/0022908 | A1* | 1/2024 | Baskaran | H04W 12/069 |

OTHER PUBLICATIONS

Ericsson, "Clean-up of TR 33.857," S3-214286, 3GPP TSG-SA3 Meeting #105-e, e-meeting, Nov. 8-19, 2021, 34 pages.

Intel, "Updates to solution 14: Removal of Editor"'s notes: Three Authentication, S3-212689, 3GPP TSG-SA3 Meeting #104-e, e-meeting, Aug. 16-27, 2021, 8 pages.

Vivo et al., "KI#4: conclusions update for CP and UP remote provisioning," S2-2100419, SA WG2 Meeting #143E (e-meeting), Feb. 24-Mar. 9, 2021, 6 pages.

Office Action dated Jun. 12, 2026, in connection with Korean Application No. 10-2021-0185215, 11 pages.

Nokia, et al., "Update to solution #19—Authorization added.", 3GPP TSG-SA3 Meeting #104-e, S3-212770-r2, Aug. 16-27, 2021, 5 pages.

* cited by examiner

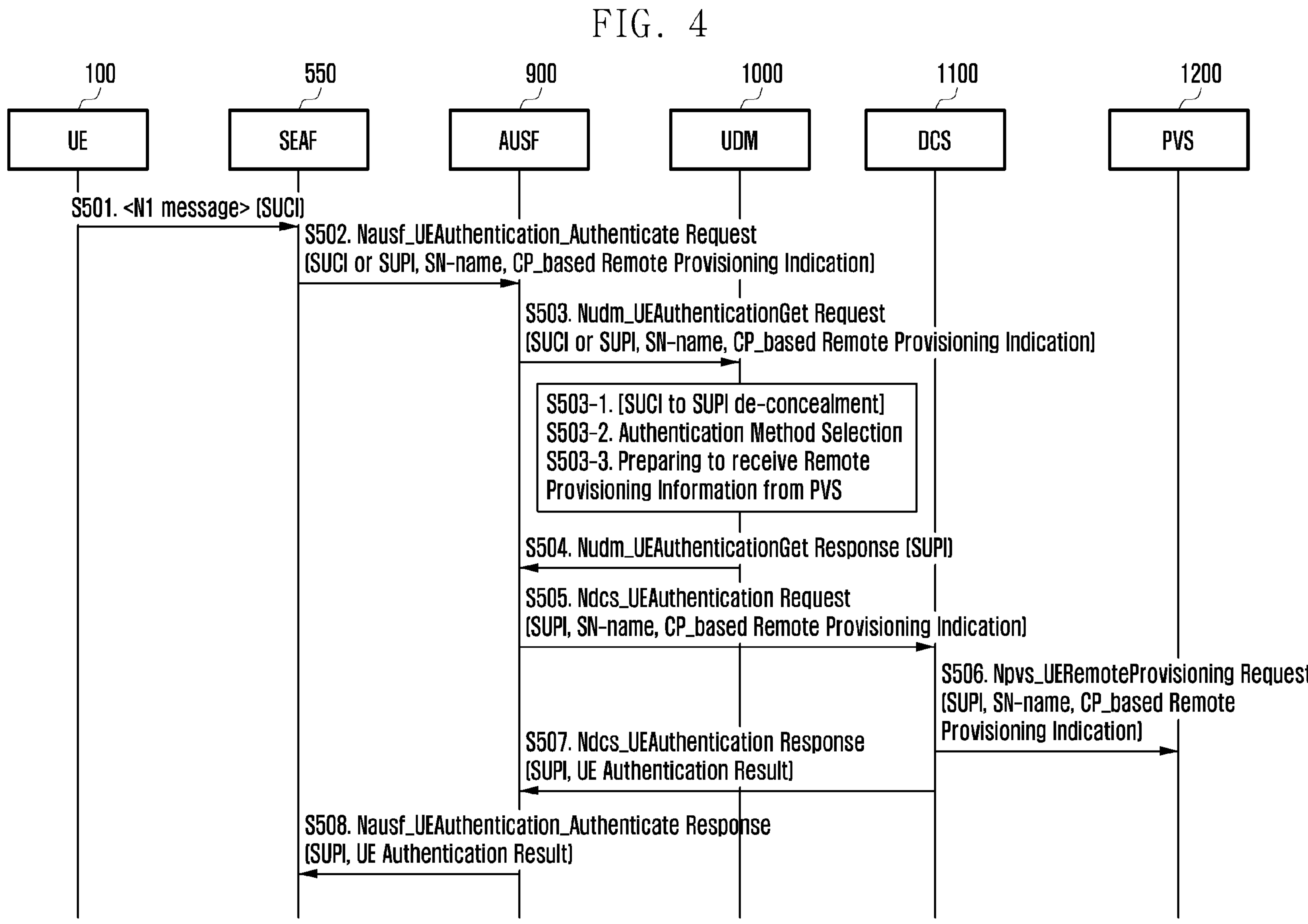
FIG. 4
100
UE
550
SEAF
900
AUSF
1000
UDM
1100
DCS
1200
PVS
S501. <N1 message> [SUCI]
S502. Nausf_UEAuthentication_Authenticate Request
[SUCI or SUPI, SN-name, CP_based Remote Provisioning Indication]
S503. Nudm_UEAuthenticationGet Request
[SUCI or SUPI, SN-name, CP_based Remote Provisioning Indication]
S503-1. [SUCI to SUPI de-concealment]
S503-2. Authentication Method Selection
S503-3. Preparing to receive Remote Provisioning Information from PVS
S504. Nudm_UEAuthenticationGet Response [SUPI]
S505. Ndcs_UEAuthentication Request
[SUPI, SN-name, CP_based Remote Provisioning Indication]
S506. Npvs_UERemoteProvisioning Request
[SUPI, SN-name, CP_based Remote Provisioning Indication]
S507. Ndcs_UEAuthentication Response
[SUPI, UE Authentication Result]
S508. Nausf_UEAuthentication_Authenticate Response
[SUPI, UE Authentication Result]

METHOD AND DEVICE FOR CONTROL PLANE-BASED REGISTRATION AND REMOTE PROVISIONING IN COMMUNICATION SYSTEM

CROSS-REFERENCE TO RELATED APPLICATION

This application is based on and claims priority under 35 U.S.C. § 119 to Korean Patent Application No. 10-2021-0185215, filed on Dec. 22, 2021, in the Korean Intellectual Property Office, the disclosure of which is herein incorporated by reference in its entirety.

BACKGROUND

1. Field

The disclosure relates to a communication system and, more particularly, to a method and a device for registration procedure and remote provisioning for a terminal which performs a control plane (CP)-based remote provisioning at the time of user equipment (UE) onboarding.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NRU) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

An aspect of the disclosure is to provide a method and a device capable of effectively providing a service in a wireless communication system.

The disclosure provides a network registration method and device for a terminal which performs a control plane (CP)-based remote provisioning when the terminal performs UE onboarding to receive standard non-public network (SNPN) credentials and user subscription data.

A device and a method according to the disclosure may effectively provide a service in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates a flowchart of g an authentication procedure when a terminal 100 makes onboarding to an SNPN 20 in a wireless communication system according to embodiments of the present disclosure;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
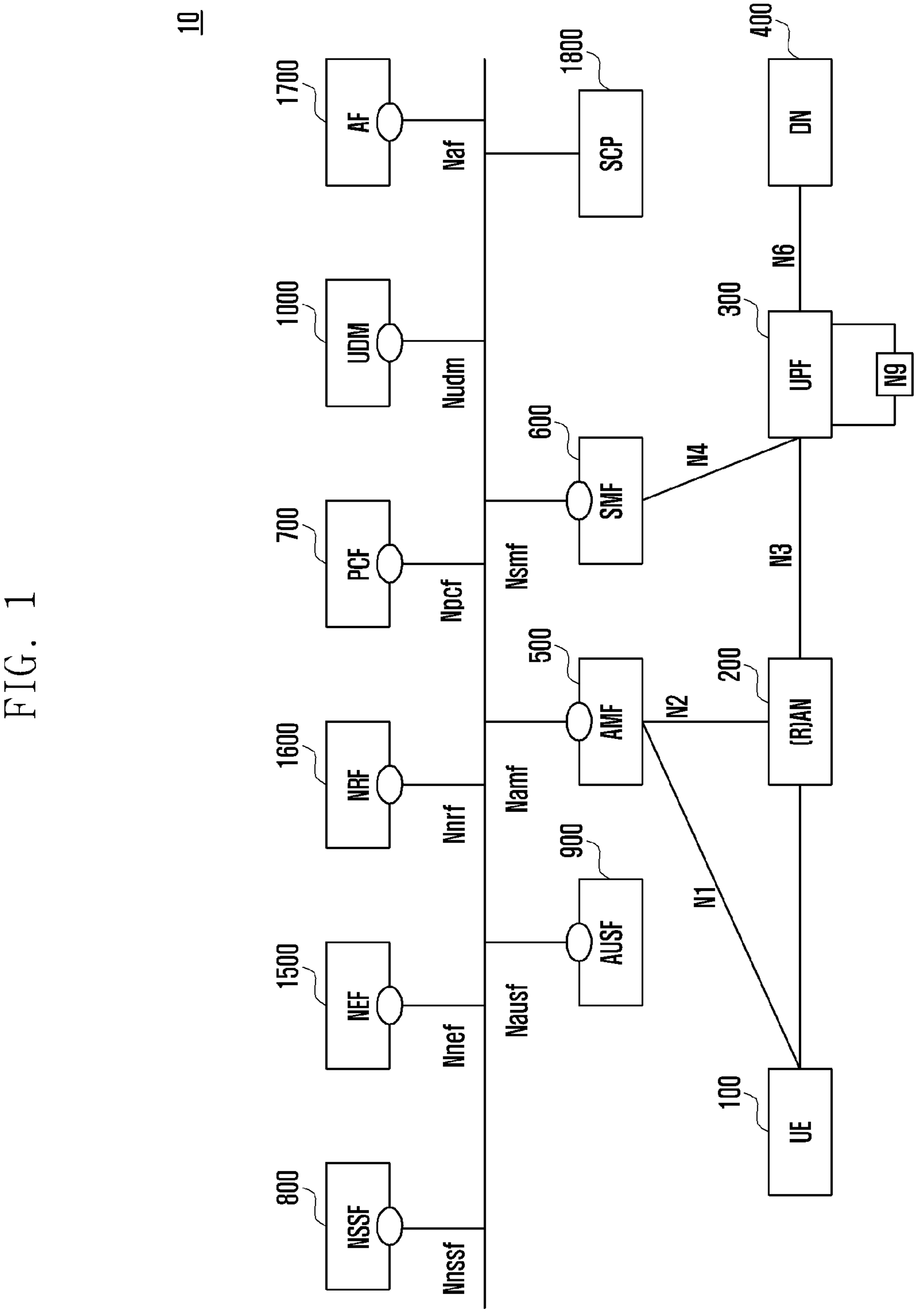
FIG. 1 illustrates a structure of a 5G network 10 according to embodiments of the present disclosure.

FIG. 1 illustrates a structure of a 5G network 10 according to embodiments of the present disclosure.

Referring to FIG. 1, the description of network entities or network nodes configuring the 5G network 10 is as follows.

A (radio) access network ((R)AN) 200, as a subject which performs radio resource allocation of a terminal 100, may be at least one of an eNode B, a Node B, a base station (BS), a next generation radio access network (NG-RAN), a 5G-AN, a radio access unit, a base station controller, or a node on the network. The terminal 100 may include a user equipment (UE), a next generation UE (NG UE), a mobile station (MS), a cellular phone, a smartphone, a computer, or a multimedia system capable of performing a communication function. In addition, although an embodiment of the disclosure is described below using a 5G system as an example, the embodiment of the disclosure may be applied to other communication systems having a similar technical background. In addition, an embodiment of the disclosure may be applied to other communication systems via some modifications within a range which does not significantly deviate from the scope of the disclosure, as determined by a person having skilled technical knowledge.

As a wireless communication system evolves from a 4G system to a 5G system, the wireless communication system defines a next generation core (NG core) or 5G core network (5GC) which is a new core network. The new core network has virtualized all existing network entities (NEs) into network functions (NFs). According to an embodiment of the disclosure, a network function may refer to a network entity, a network component, or a network resource.

According to an embodiment of the disclosure, the 5GC may include NFs 300, 400, 500, 600, 700, 800, 900, 1000, 1500, 1600, 1700, and 1800 shown in FIG. 1. The disclosure is not limited to the example of FIG. 1, and the 5GC may include a larger number of NFs or a smaller number of NFs than the NFs shown in FIG. 1.

According to an embodiment of the disclosure, an access and mobility management function (AMF) 500 may be a network function of managing the mobility of the UE 100.

According to an embodiment of the disclosure, a session management function (SMF) 600 may be a network function of managing a packet data network (PDN) connection provided to the UE 100. The PDN connection may be referred to as a packet data unit (PDU) session.

According to an embodiment of the disclosure, a policy control function (PCF) 700 may be a network function of applying a service policy, a charging policy, and a PDU session policy of a mobile communication service provider with respect to the UE 100.

According to an embodiment of the disclosure, a unified data management (UDM) 1000 may be a network function of storing information on a subscriber.

According to an embodiment of the disclosure, a network exposure function (NEF) 1500 may be a function of providing information on the UE 100 to a server outside the 5G network. In addition, the NEF 1500 may provide a function of providing information necessary for a service to the 5G network and storing the information in a UDR (not shown).

According to an embodiment of the disclosure, a user plane function (UPF) 300 may be a function which serves as a gateway for transferring user data (PDU) to a data network (DN) 400.

According to an embodiment of the disclosure, a network repository function (NRF) 1600 may perform a function of discovering an NF.

According to an embodiment of the disclosure, an authentication server function (AUSF) 900 may perform UE authentication in a 3GPP access network and a non-3GPP access network.

According to an embodiment of the disclosure, a network slice selection function (NSSF) 800 may perform a function of selecting a network slice instance provided to the UE 100.

According to an embodiment of the disclosure, the data network (DN) 400 may be a data network through which the UE 100 transmits or receives data in order to use a service of a network service provider or a third party service.

Figure 2:
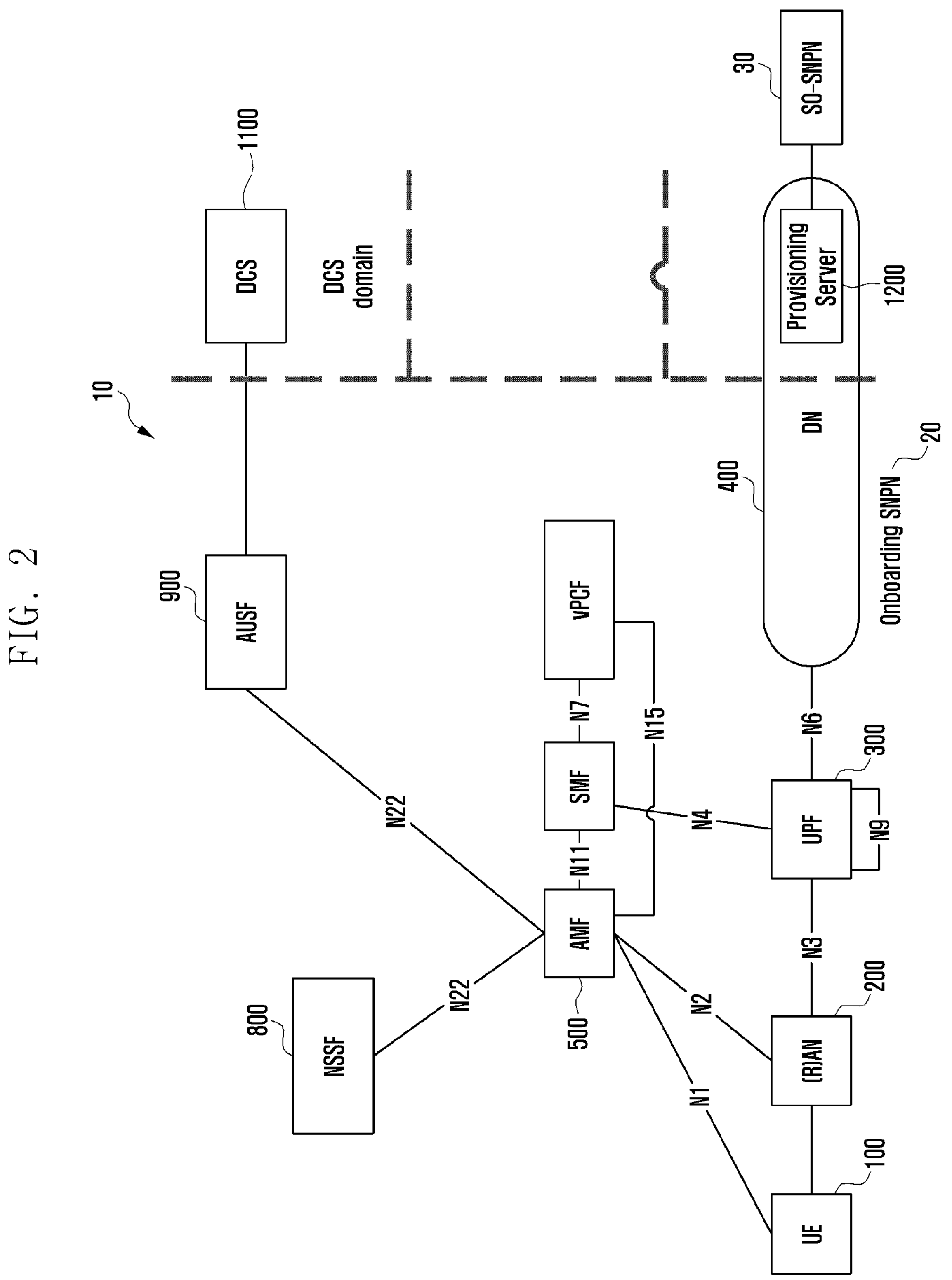
FIG. 2 illustrates a structure of a 5G network 10 according to embodiments of the present disclosure.

FIG. 2 illustrates a structure of the 5G network 10 according to embodiments of the present disclosure.

Referring to FIG. 2, the wireless communication system 10 for transmitting, to the UE 100, standalone NPN (SNPN) credentials and subscriber information for accessing an SNPN 20 may include the UE 100, the onboarding SNPN (ON-SNPN) 20, a default credentials server (DCS) 1100, a provisioning server (PVS) 1200, and a subscription owner SNPN (SO-SNPN) 30 possessing SNPN credentials and subscriber information. This figure is a conceptual diagram illustrating control plane-based remote provisioning.

First, it is assumed that the terminal (UE) 100 does not have SNPN credentials and subscriber information (user subscription data), and the UE 100 has default UE credentials allocated by the DCS 1100. In addition, the DCS 1100 may allocate a subscription permanent identifier (SUPI) capable of uniquely identifying the UE 100 to the UE 100.

The ON-SNPN 20 may provide, to the UE 100, UP-based IP connectivity (UE onboarding) or CP-based non-access stratum (NAS) connectivity (UE onboarding) such that the UE 100 without SNPN credentials and subscriber information can receive the SNPN credentials and the subscriber information. The ON-SNPN may request authentication and authorization for the UE 100 from the DCS 1100 in order to determine whether to provide a UE onboarding service to the UE 100. FIG. 2 illustrates UP-based UE onboarding.

The DCS 1100 may pre-configure default UE credentials and an SUPI with respect to the UE 100 and then store the same. The DCS 1100 may receive, from the ON-SNPN, a request for authentication for the UE 100 when performing registration for UE onboarding. The authentication and authorization for the UE 100 is performed based on the default UE credentials and SUPI.

In addition, when the PVS 1200 transmits SNPN credentials and subscriber information to the UE 100, in order to determine whether the UE 100 is a UE having the right to receive the SNPN credentials and the subscriber information, the DCS 1100 may receive a request for UE authentication for the UE 100 from the PVS 1200. The DCS 1100 may be a manufacturer of the UE 100 or a third party associated with the manufacturer or an SNPN network service provider.

The PVS 1200 may receive user subscriber information such as user configuration information and SNPN credentials from the SO-SNPN 30 and transmit the same to the UE.

The PVS 1200 may exist as one server with the DCS 1100, and like the DCS 1100, the PVS 1200 may be a server owned by the manufacturer of the UE 100 or the third party associated with the SNPN network service provider. The PVS 1200 may communicate with the DCS 1100 for the authentication and authorization of the UE 100.

The SO-SNPN 30 possessing the SNPN credentials and the user subscriber information may transmit the SNPN credentials and the user subscriber information to the UE 100 via the PVS 1200.

Figure 3:
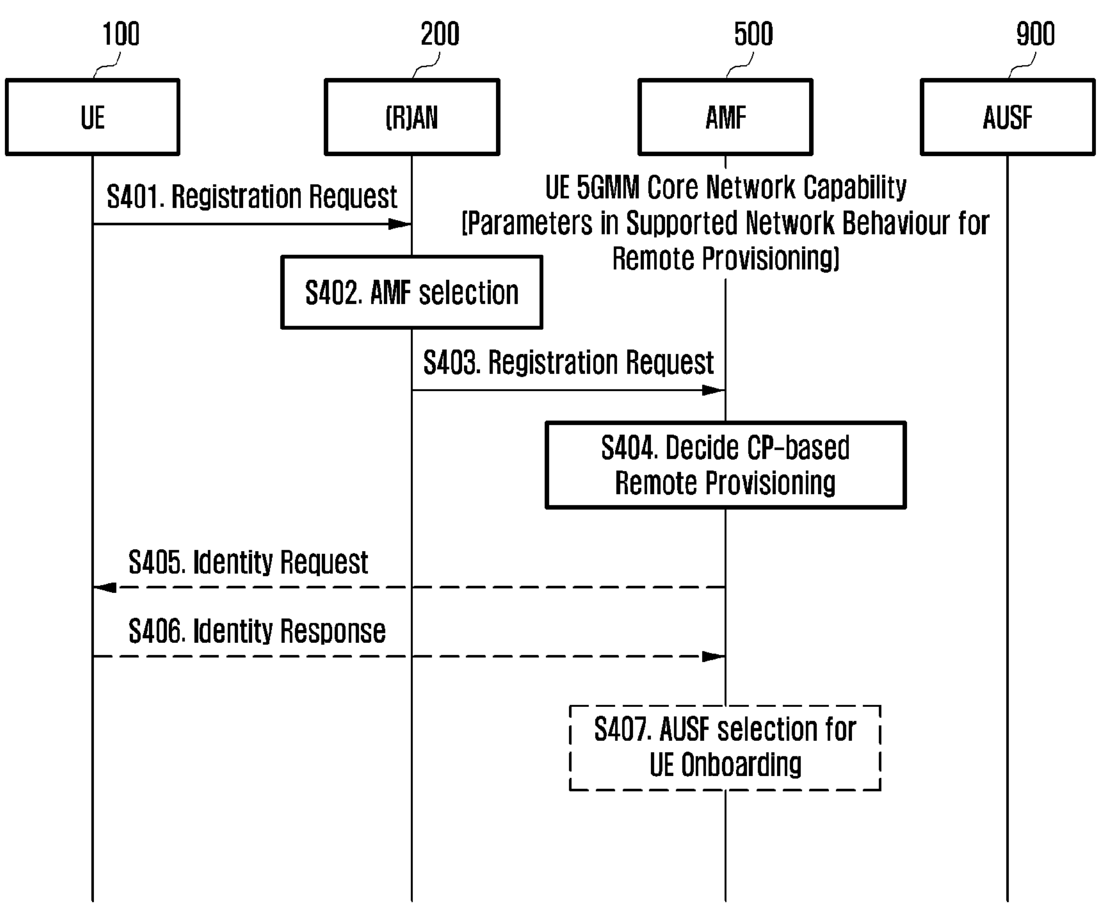
FIG. 3 illustrates a flowchart of a procedure in which a terminal 100 registers with an SNPN 20 in a wireless communication system 10 according to embodiments of the present disclosure.

FIG. 3 illustrates a flowchart of a procedure in which the UE 100 registers with the SNPN 20 in the wireless communication system 10 according to embodiments of the present disclosure.

Referring to FIG. 3, in operation S401, the UE 100 may transmit a registration request message to the (R)AN 200 in order to make onboarding to the ON-SNPN 20. The registration request message may include information indicating that the UE 100 performs CP-based remote provisioning. For example, the registration request message may include a 5GS mobility management (5GMM) core network capability parameter. For example, the 5GMM core network capability parameter may include an information element (IE) called a parameter of a network operation for supporting remote provisioning (parameter in supported network behavior for remote provisioning). For example, the information element may indicate a remote provisioning scheme requested by the UE 100. For example, the information element may indicate control plane-based remote provisioning. The RAN 200 may receive the registration request message from the UE 100.

In operation S402, the RAN 200 may select the AMF 500 supporting onboarding, based on the registration request message received from the UE 100.

In operation S403, the RAN 200 may transmit the registration request message received from the UE 100 to the selected AMF 500. The AMF 500 may receive the registration request message from the RAN 200.

In operation S404, the AMF 500 may determine a remote provisioning scheme for the UE 100, based on the registration request message. For example, the AMF 500 may determine a remote provisioning scheme for the UE 100, based on the 5GMM core network capability parameter included in the registration request message. For example, the AMF 500 may determine the remote provisioning scheme for the UE 100 as a control plane-based (CP-based) remote provisioning, based on the 5GMM core network capability parameter.

In operation S405, the AMF 500 may transmit an identifier request message for requesting an identifier of the UE 100 to the UE 100. For example, the identifier of the UE 100 may be an international mobile equipment identity (IMEI). The UE 100 may receive the identifier request message from the AMF 500.

In operation S406, the UE 100 may transmit an identifier response message including the identifier of the UE 100 to the AMF 500, based on the identifier request message received from the AMF 500. The AMF 500 may receive the identifier response message from the UE 100. Operations S405 and S406 may be selectively performed.

In operation S407, the AMF 500 may select the AUSF 900 which performs authentication for the UE 100. For example, when operations S405 and S406 are performed, the AMF 500 may select the AUSF 900, based on the registration request message and the identifier response message. For example, when operations S405 and S406 are not performed, the AMF 500 may select the AUSF 900, based on the registration request message.

FIG. 4 illustrates a flowchart of an authentication procedure when the UE 100 makes onboarding to the SNPN 20 in a wireless communication system according to embodiments of the present disclosure.

Referring to FIG. 4, an authentication procedure when the UE 100 makes onboarding to the SNPN 20 may be performed simultaneously with a registration procedure of the UE 100 of FIG. 3. For example, operations S501 to S504 may be performed during the SNPN registration procedure of FIG. 3.

In operation S501, the UE 100 may transmit an N1 message to a security anchor function (SEAF) 550. For example, the N1 message may include a subscription concealed identifier (SUCI). The SEAF 900 may receive the N1 message from the UE 100.

In operation S502, the SEAF 550 may transmit a UE authentication request message (Nausf_UEAuthentication_Authenticate Request) to the AUSF 900. The SEAF 550 may generate the UE authentication request message, based on the N1 message. For example, the UE authentication request message may include an SUCI (or subscription permanent identifier (SUPI)), a serving network (SN)-name, and a control plane-based remote provisioning indicator. The AUSF 900 may receive the UE authentication request message from the SEAF 550.

In operation S503, the AUSF 900 may generate a UE authentication acquisition request message (Nudm_UEAuthenticationGet Request), based on the UE authentication request message received from the SEAF 550. The AUSF 900 may transmit the UE authentication acquisition request message to the UDM 1000. For example, the UE authentication acquisition request message may include an SUCI (or SUPI), an SN-name, and a control plane-based remote provisioning indicator. The UDM 1000 may receive the UE authentication acquisition request message from the AUSF 900.

In operation S503-1, the UDM 1000 may de-conceal the SUCI, based on the UE authentication acquisition request message received from the AUSF 900 to convert the SUCI into the SUPI.

In operation S503-2, the UDM 1000 may select an authentication method, based on the UE authentication request message. In operation S503-3, the UDM 1000 may prepare to perform control plane-based remote provisioning, based on the UE authentication request message. For example, the UDM 1000 may prepare to receive remote provisioning information from the PVS 1200, based on the UE authentication request message.

In operation S504, the UDM 1000 may transmit a UE authentication acquisition response message (Nudm_UEAuthenticationGet Response) to the AUSF 900. The UE authentication acquisition response message may include an SUPI. The AUSF 900 may receive the UE authentication acquisition response message from the UDM 1000.

In operation S505, the AUSF 900 may select the DCS 1100, based on the SUPI included in the UE authentication acquisition response message received from the UDM 1000. The AUSF 900 may generate a UE authentication request message (Ndcs_UEAuthentication Request), based on the UE authentication acquisition response message. For example, the UE authentication request message may include an SUPI, an SN-name, and a control plane-based remote provisioning indicator. The AUSF 900 may transmit the UE authentication request message to the DCS 1100. The DCS 1100 may receive the UE authentication request message from the AUSF 900.

In operation S506, the DCS 1100 may perform authentication for the UE 100, based on the UE authentication request message received from the AUSF 900. The DCS 1100 may generate a UE remote provisioning request message (Npvs_UERemoteProvisioning Request), based on the UE authentication request message. For example, the UE remote provisioning request message may include an SUPI, an SN-name, and a control plane-based remote provisioning indicator. The DCS 1100 may transmit the UE remote provisioning request message to the PVS 1200 after performing the authentication for the UE 100. The PVS 1200 may receive the UE remote provisioning request message from the DCS 1100. The PVS 1200 may perform control plane-based remote provisioning with respect to the UE 100, based on the UE remote provisioning request message.

In operation S507, the DCS 1100 may generate a UE authentication response message (Ndcs_UEAuthentication Response), based on a result of performing the authentication for the UE 100. For example, the UE authentication response message may include an SUPI and a UE authentication result. The DCS 1100 may transmit the UE authentication response message to the AUSF 900. The AUSF 900 may receive the UE authentication response message from the DCS 1100.

In operation S508, the AUSF 900 may generate a UE authentication response message (Nausf_UEAuthentication_Authenticate Response), based on the UE authentication response message received from the DCS 1100. For example, the UE authentication response message may include an SUPI and a UE authentication result. The AUSF 900 may transmit the UE authentication response message to the SEAF 550. The SEAF 550 may receive the UE authentication response message from the AUSF 900.

Figure 5:
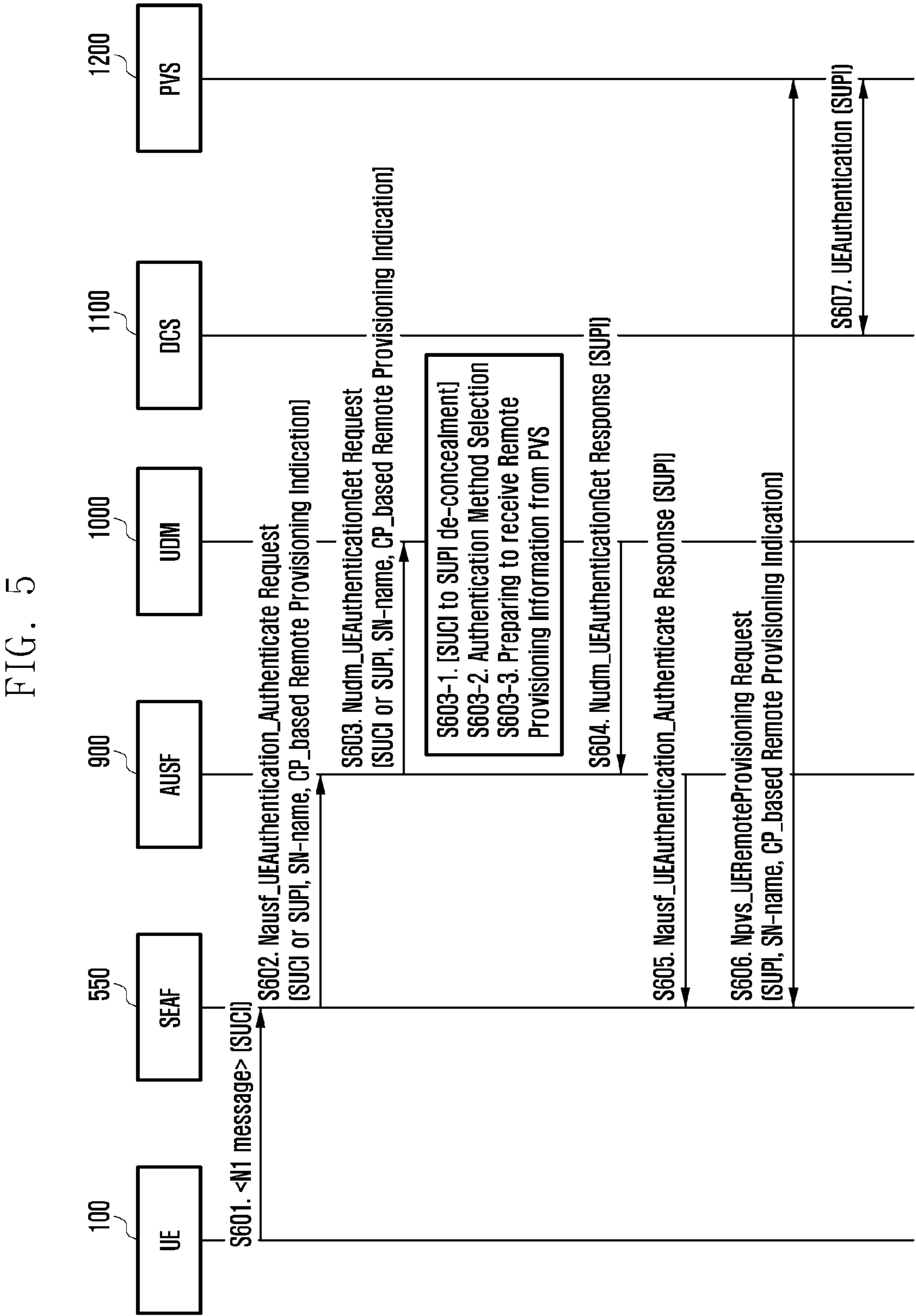
FIG. 5 illustrates a flowchart of an authentication procedure when a terminal 100 makes onboarding to an SNPN 20 in a wireless communication system according to embodiments of the present disclosure.

FIG. 5 illustrates a flowchart of an authentication procedure when the UE 100 makes onboarding to the SNPN 20 in a wireless communication system according to embodiments of the present disclosure.

Referring to FIG. 5, FIG. 5 may be another embodiment of FIG. 4. For example, operations S601 to S604 may be the same as operations S501 to S504 of FIG. 4. In FIG. 5, it is assumed that UE authentication by the DCS 1100 has already been performed.

In operation S605, the AUSF 900 may generate a UE authentication response message, based on a UE authentication acquisition response message received from the UDM 1000. For example, the UE authentication response message may include an SUPI. The AUSF 900 may transmit the UE authentication response message to the SEAF 550. The SEAF 550 may receive a UE authentication request message from the AUSF 900.

In operation S606, the SEAF 550 may generate a UE remote provisioning request message (Npvs_UERemoteProvisioning Request), based on the UE authentication request message received from the AUSF 900. For example, the UE remote provisioning request message may include an SUPI, an SN-name, and a control plane-based remote provisioning indicator. The SEAF 550 may transmit the UE remote provisioning request message to the PVS 1200. The PVS 1200 may receive the UE remote provisioning request message from the SEAF 550.

In operation S607, the PVS 1200 may perform control plane-based remote provisioning with respect to the UE 100, based on the UE remote provisioning request message received from the SEAF 550. The PVS 1200 may perform UE authentication with the DCS 1100, based on the UE remote provisioning request message received from the SEAF 550. For example, the PVS 1200 may generate a UE authentication request message, based on the UE remote provisioning request message. The UE authentication request message may include an SUPI. The PVS 1200 may transmit the UE authentication request message to the DCS 1100. The DCS 1100 may receive the UE authentication request message from the PVS 1200. In response to the UE authentication request message, the DCS 1100 may transmit, to the PVS 1200, the authentication result for the UE 100 which has already been performed.

Figure 6:
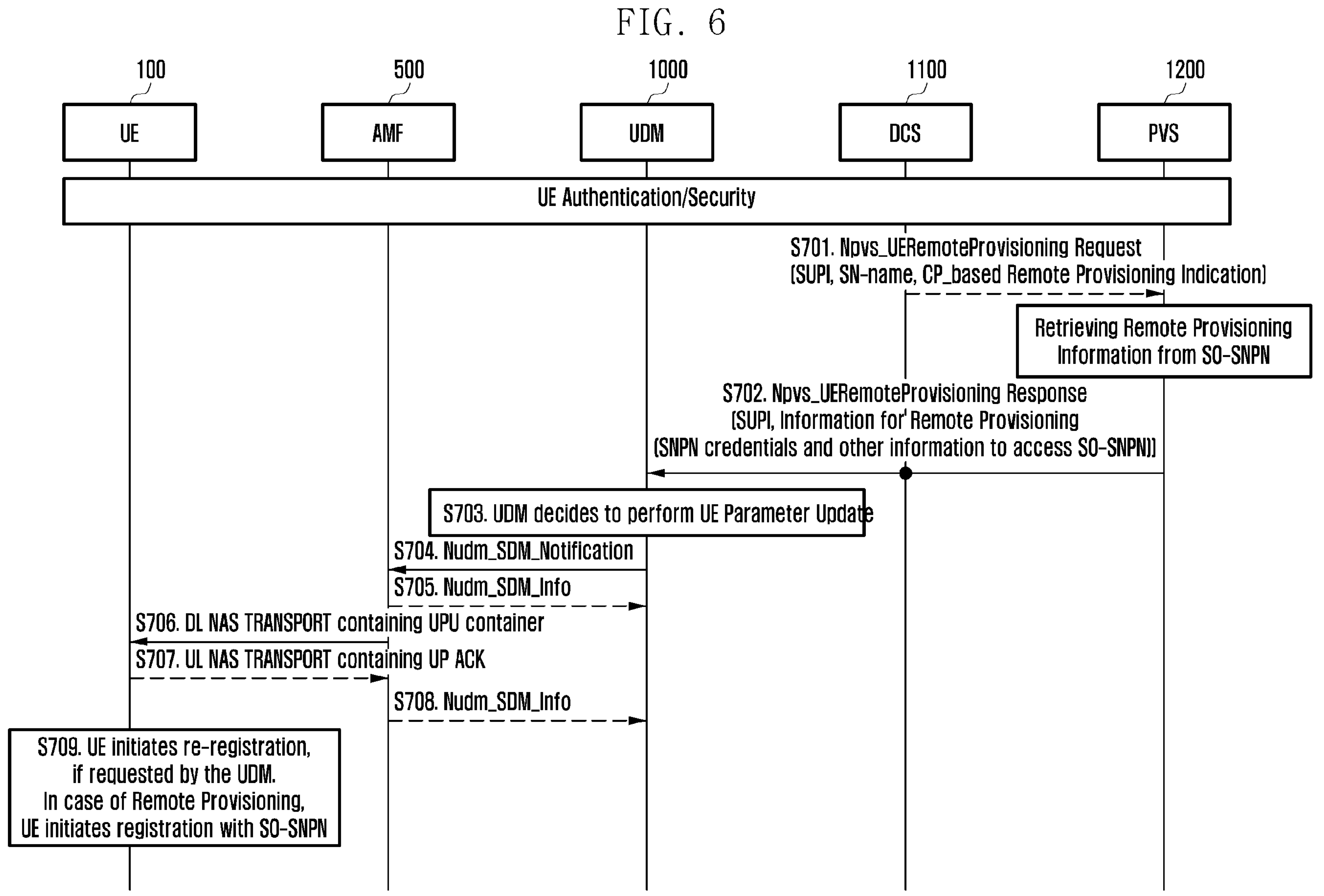
FIG. 6 illustrates a flowchart of a procedure for performing control plane-based remote provisioning from a PVS 1200 in a wireless communication system according to embodiments of the present disclosure.

FIG. 6 illustrates a flowchart of a procedure for performing control plane-based remote provisioning from the PVS 1200 in a wireless communication system according to embodiments of the present disclosure.

Referring to FIG. 6, the UE 100, the AMF 500, the UDM 1000, the DCS 1100, and the PVS 1200 may perform an operation for UE authentication/security. For example, the DCS 1100 may authenticate the UE 100 via the operation for UE authentication/security.

In operation S701, after authenticating the UE 100, the DCS 1100 may generate a UE remote provisioning request message (Npvs_UERemoteProvisioning Request). For example, the UE remote provisioning request message may include an SUPI, an SN-name, and a control plane-based remote provisioning indicator. The DCS 1100 may transmit the UE remote provisioning request message to the PVS 1200. The PVS 1200 may receive the UE remote provisioning request message from the DCS 1100.

The PVS 1200 may transmit a request message for requesting remote provisioning information to the SO-SNPN 30, based on the UE remote provisioning request message. The PVS 1200 may receive the remote provisioning information from the SO-SNPN 30 in response to the request message. For example, the remote provisioning information may include SNPN credential information and access information for accessing the SO-SNPN 30.

In operation S702, the PVS 1200 may generate a UE remote provisioning response message (Npvs_UERemoteProvisioning Response), based on the remote provisioning information. For example, the UE remote provisioning response message may include an SUPI, SNPN credential information, and access information for accessing the SO-SNPN 30. The PVS 1200 may transmit the UE remote provisioning response message to the UDM 1000. The UDM 1000 may receive the UE remote provisioning response message from the PVS 1200.

In operation S703, the UDM 1000 may determine to perform a UE parameters update (UPU) procedure. The UDM 1000 may update a parameter for the UE 100, based on the UE remote provisioning response message received from the PVS 1200.

In operation S704, the UDM 1000 may generate a subscriber data management (SDM) notification message (Nudm_SDM_Notification), based on the updated parameter. The UDM 1000 may transmit the SDM_notification message to the AMF 500. The AMF 500 may receive the SDM notification message from the UDM 1000.

In operation S705, the AMF 500 may transmit an SDM information message (Nudm_SDM_Info) to the UDM 1000 in response to the SDM notification message. The UDM 1000 may receive the SDM information message from the AMF 500.

In operation S706, the AMF 500 may generate a downlink (DL) NAS transport message including a UPU container. The AMF 500 may transmit the DL NAS transport message to the UE 100. The UE 100 may receive the DL NAS transport message from the AMF 500.

In operation S707, the UE 100 may generate a uplink (UL) NAS message including an UP acknowledgment (ACK), based on the DL NAS transport message. The UE 100 may transmit the UL NAS message to the AMF 500. The AMF 500 may receive the UL NAS message from the UE 100.

In operation S708, the AMF 500 may generate an SDM information message, based on the UL NAS message. The AMF 500 may transmit the SDM information message to the UDM 1000.

In operation S709, the UE 100 may terminate access to the ON-SNPN 20 in order to access the SO-SNPN 30. For example, the UE 100 may determine whether a request for re-registration has been generated from the UDM 1000, based on the DL NAS transport message. When the request for re-registration is generated from the UDM 1000, the UE 100 may initialize the re-registration. For example, the UE 100 may initialize registration to access the SO-SNPN 30.

Figure 7:
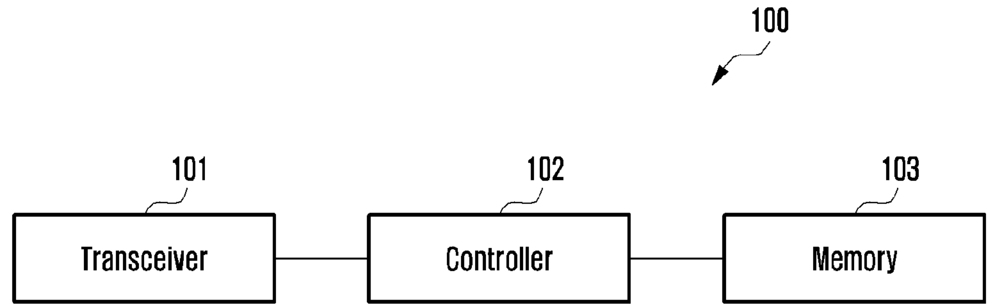
FIG. 7 illustrates a configuration of a terminal 100 according to embodiments of the present disclosure.

FIG. 7 illustrates a configuration of the UE 100 according to embodiments of the present disclosure.

The UE 100 according to the disclosure may include a controller 102 configured to control the overall operation of the UE 100, a transceiver 101 including a transmitter and a receiver, and a memory 103. The disclosure is not limited to the above example, and the UE may include more or fewer configurations than the configurations shown in FIG. 7.

According to the disclosure, the transceiver 101 may transmit or receive a signal to or from network entities 200, 300, 400, 500, 600, 700, 800, 900, 1000, 1100, 1200, 1400, 1500, 1600, and 1700 or another UE. A signal transmitted to or received from the network entities 200, 300, 400, 500, 600, 700, 800, 900, 1000, 1100, 1200, 1400, 1500, 1600, and 1700 may include control information and data. In addition, the transceiver 101 may receive a signal via a wireless channel to output the signal to the controller 102, and transmit the signal output from the controller 102 via the wireless channel.

According to the disclosure, the controller 102 may control the UE 100 to perform the operations of FIGS. 3 to 6 described above. The controller 102, the memory 103, and the transceiver 101 are not required to be necessarily implemented as separate modules, and may be implemented as one component in the form of a single chip. In addition, the controller 102 and the transceiver 101 may be electrically connected to each other. In addition, the controller 102 may be an application processor (AP), a communication processor (CP), a circuit, an application-specific circuit, or at least one processor.

According to an embodiment of the disclosure, the memory 103 may store data, such as a basic program, an application program, and configuration information, for the operation of the UE 100. In particular, the memory 103 provides the stored data according to a request of the controller 102. The memory 103 may be configured by a storage medium such as a ROM, a RAM, a hard disk, a CD-ROM, and a DVD, or a combination of storage mediums. In addition, the UE may include a plurality of memories 103. In addition, the controller 102 may perform the above-described embodiments, based on a program for performing the above-described embodiments of the disclosure, the program being stored in the memory 103.

Figure 8:
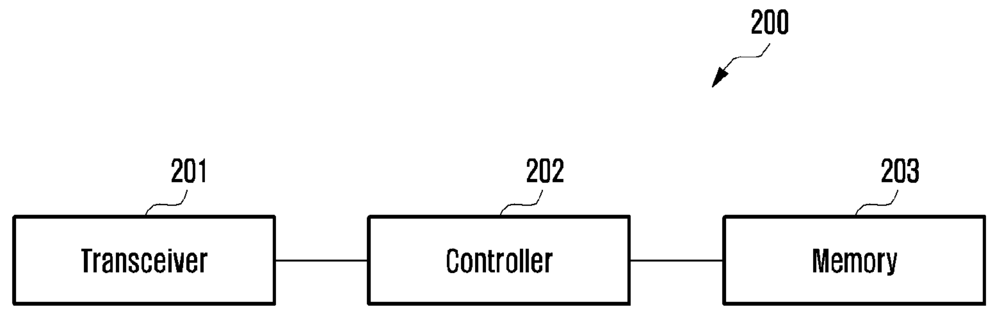
FIG. 8 illustrates a configuration of a base station 200 according to embodiments of the present disclosure.

FIG. 8 illustrates a configuration of the base station 200 according to embodiments of the present disclosure.

The base station 200 according to the disclosure may include a controller 202 configured to control the overall operation of the base station 200, a transceiver 201 including a transmitter and a receiver, and a memory 203. The disclosure is not limited to the above example, and the base station 200 may include more or fewer configurations than the configurations shown in FIG. 8.

According to the disclosure, the transceiver 201 may transmit or receive a signal to or from at least one of other network entities 300, 400, 500, 600, 700, 800, 900, 1000, 1100, 1200, 1400, 1500, 1600, and 1700 or the UE 100. A signal transmitted to or received from at least one of the other network entities 300, 400, 500, 600, 700, 800, 900, 1000, 1100, 1200, 1400, 1500, 1600, and 1700 or the UE 100 may include control information and data.

According to the disclosure, the controller 202 may control the base station 200 to perform the operations of FIGS. 3 to 6 described above. The controller 202, the memory 203, and the transceiver 201 are not required to be necessarily implemented as separate modules, and may be implemented as one component in the form of a single chip. In addition, the controller 202 and the transceiver 201 may be electrically connected to each other. In addition, the controller 202 may be an application processor (AP), a communication processor (CP), a circuit, an application-specific circuit, or at least one processor.

According to the disclosure, the memory 203 may store data, such as a basic program, an application program, and configuration information, for the operation of the base station 200. In particular, the memory 203 provides the stored data according to a request of the controller 202. The memory 203 may be configured by a storage medium such as a ROM, a RAM, a hard disk, a CD-ROM, and a DVD, or a combination of storage mediums. In addition, there may be a plurality of memories 203. In addition, the controller 202 may perform the above-described embodiments, based on a program for performing the above-described embodiments of the disclosure, the program being stored in the memory 203.

Figure 9:
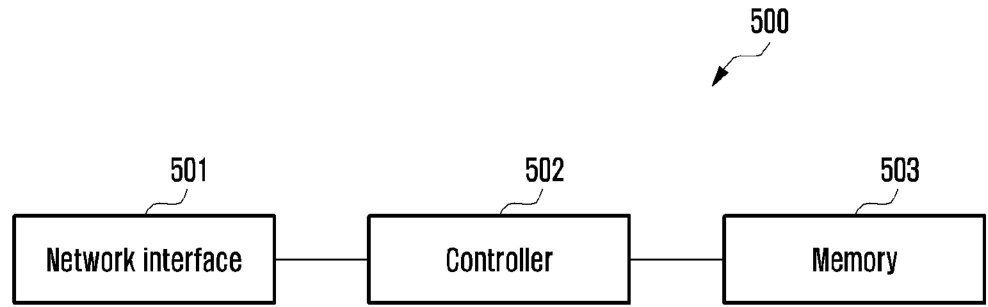
FIG. 9 illustrates a configuration of an AMF 500 according to embodiments of the present disclosure.

FIG. 9 illustrates a configuration of the AMF 500 according to embodiments of the present disclosure.

The AMF 500 according to the disclosure may include a controller 502 configured to control the overall operation of the AMF 500, a network interface 501 including a transmitter and a receiver, and a memory 503. The disclosure is not limited to the above example, and the AMF 500 may include more or fewer configurations than the configurations shown in FIG. 9.

According to the disclosure, the network interface 501 may transmit or receive a signal to or from at least one of other network entities 200, 300, 400, 600, 700, 800, 900, 1000, 1100, 1200, 1400, 1500, 1600, and 1700 or the UE 100. A signal transmitted to or received from at least one of the other network entities 200, 300, 400, 600, 700, 800, 900, 1000, 1100, 1200, 1400, 1500, 1600, and 1700 or the UE 100 may include control information and data.

According to the disclosure, the controller 502 may control the AMF 500 to perform the operations of FIGS. 3 to 6 described above. The controller 502, the memory 503, and the network interface 501 are not required to be necessarily implemented as separate modules, and may be implemented as one component in the form of a single chip. In addition, the controller 502 and the network interface 501 may be electrically connected to each other. In addition, the controller 502 may be an application processor (AP), a communication processor (CP), a circuit, an application-specific circuit, or at least one processor.

According to the disclosure, the memory 503 may store data, such as a basic program, an application program, and configuration information, for the operation of the AMF 500. In particular, the memory 503 provides the stored data according to a request of the controller 502. The memory 503 may be configured by a storage medium such as a ROM, a RAM, a hard disk, a CD-ROM, and a DVD, or a combination of storage mediums. In addition, there may be a plurality of memories 503. In addition, the controller 502 may perform the above-described embodiments, based on a program for performing the above-described embodiments of the disclosure, the program being stored in the memory 503.

Figure 10:
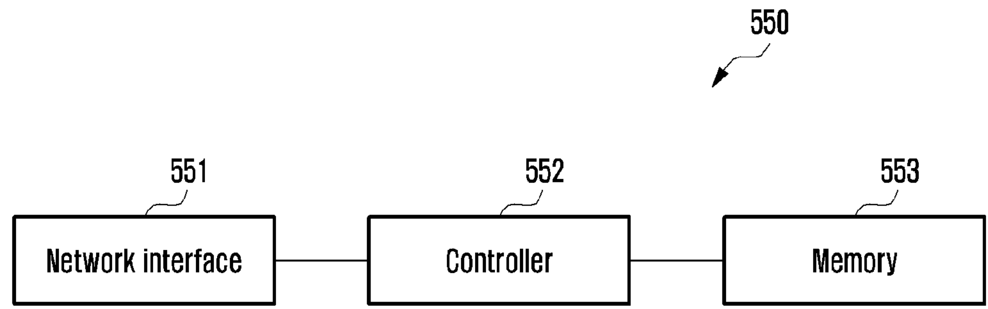
FIG. 10 illustrates a configuration of an SEAF 550 according to embodiments of the present disclosure.

FIG. 10 illustrates a configuration of the SEAF 550 according to embodiments of the present disclosure.

The SEAF 550 according to the disclosure may include a controller 552 configured to control the overall operation of the SEAF 550, a network interface 551 including a transmitter and a receiver, and a memory 553. The disclosure is not limited to the above example, and the SEAF 550 may include more or fewer configurations than the configurations shown in FIG. 10.

According to the disclosure, the network interface 551 may transmit or receive a signal to or from at least one of other network entities 200, 300, 400, 500, 600, 700, 800, 900, 1000, 1100, 1200, 1400, 1500, 1600, and 1700 or the UE 100. A signal transmitted to or received from at least one of the other network entities 200, 300, 400, 500, 600, 700, 800, 900, 1000, 1100, 1200, 1400, 1500, 1600, and 1700 or the UE 100 may include control information and data.

According to the disclosure, the controller 552 may control the SEAF 550 to perform the operations of FIGS. 3 to 6 described above. The controller 552, the memory 553, and the network interface 551 are not required to be necessarily implemented as separate modules, and may be implemented as one component in the form of a single chip. In addition, the controller 552 and the network interface 551 may be electrically connected to each other. In addition, the controller 552 may be an application processor (AP), a communication processor (CP), a circuit, an application-specific circuit, or at least one processor.

According to the disclosure, the memory 553 may store data, such as a basic program, an application program, and configuration information, for the operation of the SEAF 550. In particular, the memory 553 provides the stored data according to a request of the controller 552. The memory 553 may be configured by a storage medium such as a ROM, a RAM, a hard disk, a CD-ROM, and a DVD, or a combination of storage mediums. In addition, there may be a plurality of memories 553. In addition, the controller 552 may perform the above-described embodiments, based on a program for performing the above-described embodiments of the disclosure, the program being stored in the memory 553.

Figure 11:
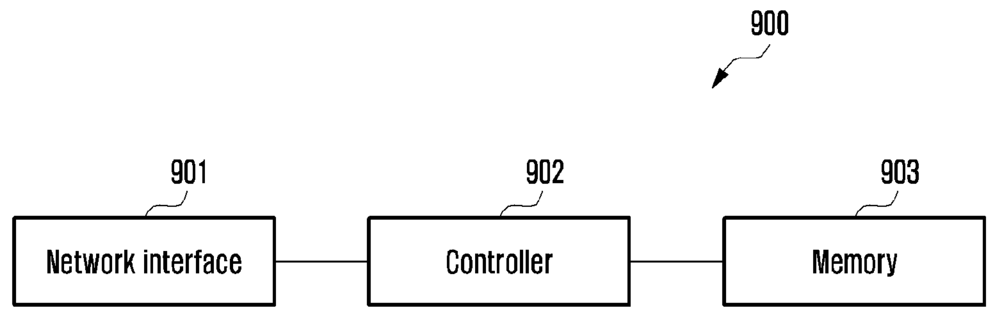
FIG. 11 illustrates a configuration of an AUSF 900 according to embodiments of the present disclosure.

FIG. 11 illustrates a configuration of the AUSF 900 according to embodiments of the present disclosure.

The AUSF 900 according to the disclosure may include a controller 902 configured to control the overall operation of the AUSF 900, a network interface 901 including a transmitter and a receiver, and a memory 903. The disclosure is not limited to the above example, and the AUSF 900 may include more or fewer configurations than the configurations shown in FIG. 11.

According to the disclosure, the network interface 901 may transmit or receive a signal to or from at least one of other network entities 200, 300, 400, 500, 550, 600, 700, 800, 900, 1100, 1200, 1400, 1500, 1600, and 1700 or the UE 100. A signal transmitted to or received from at least one of the other network entities 200, 300, 400, 500, 550, 600, 700, 800, 900, 1100, 1200, 1400, 1500, 1600, and 1700 or the UE 100 may include control information and data.

According to the disclosure, the controller 902 may control the AUSF 900 to perform the operations of FIGS. 3 to 6 described above. The controller 902, the memory 903, and the network interface 901 are not required to be necessarily implemented as separate modules, and may be implemented as one component in the form of a single chip. In addition, the controller 902 and the network interface 901 may be electrically connected to each other. In addition, the controller 902 may be an application processor (AP), a communication processor (CP), a circuit, an application-specific circuit, or at least one processor.

According to the disclosure, the memory 903 may store data, such as a basic program, an application program, and configuration information, for the operation of the AUSF 900. In particular, the memory 1003 provides the stored data according to a request of the controller 902. The memory 903 may be configured by a storage medium such as a ROM, a RAM, a hard disk, a CD-ROM, or a DVD, or a combination of storage mediums. In addition, there may be a plurality of memories 903. In addition, the controller 902 may perform the above-described embodiments, based on a program for performing the above-described embodiments of the disclosure, the program being stored in the memory 903.

Figure 12:
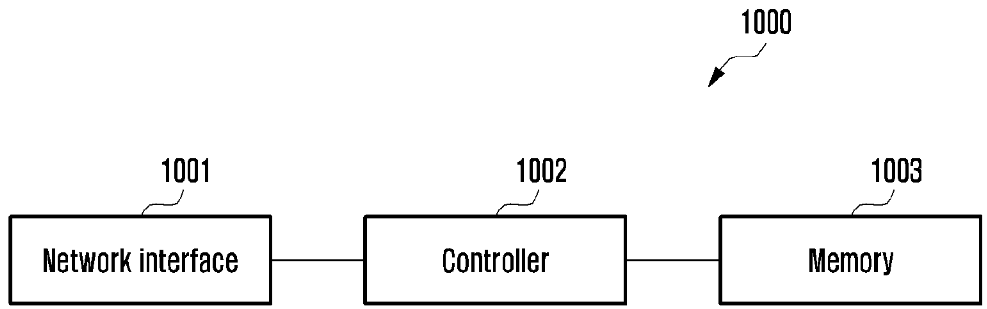
FIG. 12 illustrates a configuration of a UDM 1000 according to embodiments of the present disclosure.

FIG. 12 illustrates a configuration of the UDM 1000 according to embodiments of the present disclosure.

The UDM 1000 according to the disclosure may include a controller 1002 configured to control the overall operation of the UDM 1000, a network interface 1001 including a transmitter and a receiver, and a memory 1003. The disclosure is not limited to the above example, and the UDM 1000 may include more or fewer configurations than the configurations shown in FIG. 12.

According to the disclosure, the network interface 1001 may transmit or receive a signal to or from at least one of other network entities 200, 300, 400, 500, 550, 600, 700, 800, 900, 1100, 1200, 1400, 1500, 1600, and 1700 or the UE 100. A signal transmitted to or received from at least one of the other network entities 200, 300, 400, 500, 550, 600, 700, 800, 900, 1100, 1200, 1400, 1500, 1600, and 1700 or the UE 100 may include control information and data.

According to the disclosure, the controller 1002 may control the UDM 1000 to perform the operations of FIGS. 3 to 6 described above. The controller 1002, the memory 1003, and the network interface 1001 are not required to be necessarily implemented as separate modules, and may be implemented as one component in the form of a single chip. In addition, the controller 1002 and the network interface 1001 may be electrically connected to each other. In addition, the controller 1002 may be an application processor (AP), a communication processor (CP), a circuit, an application-specific circuit, or at least one processor.

According to the disclosure, the memory 1003 may store data, such as a basic program, an application program, and configuration information, for the operation of the UDM 1000. In particular, the memory 1003 provides the stored data according to a request of the controller 1002. The memory 1003 may be configured by a storage medium such as a ROM, a RAM, a hard disk, a CD-ROM, or a DVD, or a combination of storage mediums. In addition, there may be a plurality of memories 1003. In addition, the controller 1002 may perform the above-described embodiments, based on a program for performing the above-described embodiments of the disclosure, the program being stored in the memory 1003.

Figure 13:
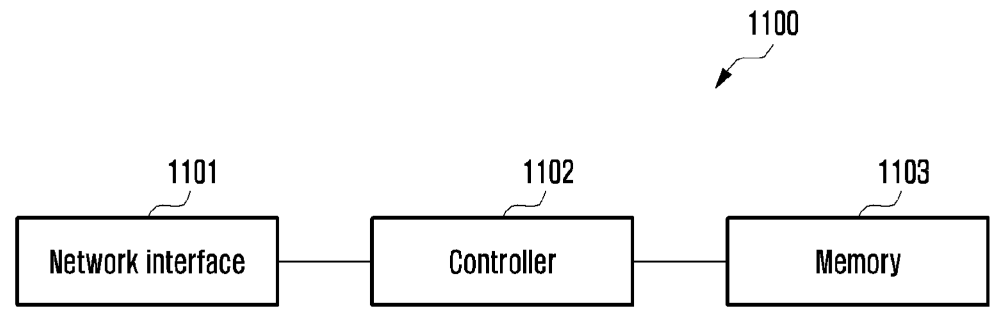
FIG. 13 illustrates a configuration of a DCS 1100 according to embodiments of the present disclosure.

FIG. 13 illustrates a configuration of the DCS 1100 according to embodiments of the present disclosure.

The DCS 1100 according to the disclosure may include a controller 1202 configured to control the overall operation of the DCS 1100, a network interface 1101 including a transmitter and a receiver, and a memory 1103. The disclosure is not limited to the above example, and the DCS 1100 may include more or fewer configurations than the configurations shown in FIG. 13.

According to the disclosure, the network interface 1101 may transmit or receive a signal to or from at least one of other network entities 200, 300, 400, 500, 550, 600, 700, 800, 900, 1000, 1200, 1400, 1500, 1600, and 1700 or the UE 100. A signal transmitted to or received from at least one of the other network entities 200, 300, 400, 500, 550, 600, 700, 800, 900, 1000, 1200, 1400, 1500, 1600, and 1700 or the UE 100 may include control information and data.

According to the disclosure, the controller 1102 may control the DCS 1100 to perform the operations of FIGS. 3 to 6 described above. The controller 1102, the memory 1103, and the network interface 1101 are not required to be necessarily implemented as separate modules, and may be implemented as one component in the form of a single chip. In addition, the controller 1102 and the network interface 1101 may be electrically connected to each other. In addition, the controller 1102 may be an application processor (AP), a communication processor (CP), a circuit, an application-specific circuit, or at least one processor.

According to the disclosure, the memory 1103 may store data, such as a basic program, an application program, and configuration information, for the operation of the DCS 1100. In particular, the memory 1103 provides the stored data according to a request of the controller 1102. The memory 1103 may be configured by a storage medium such as a ROM, a RAM, a hard disk, a CD-ROM, and a DVD, or a combination of storage mediums. In addition, there may be a plurality of memories 1103. In addition, the controller 1102 may perform the above-described embodiments, based on a program for performing the above-described embodiments of the disclosure, the program being stored in the memory 1103.

Figure 14:
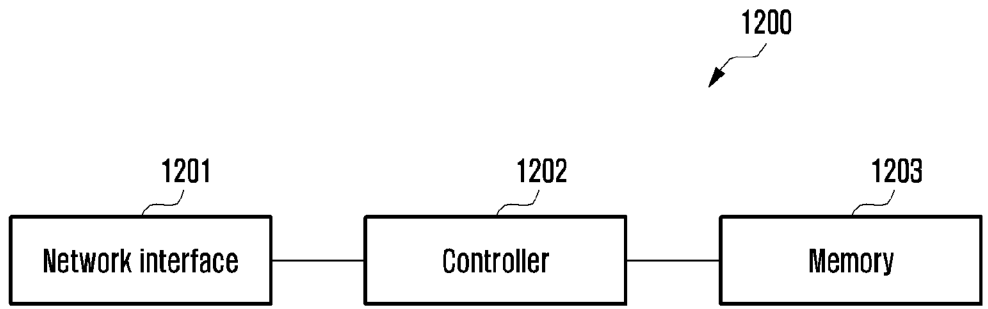
FIG. 14 illustrates a configuration of a PVS 1200 according to embodiments of the present disclosure.

FIG. 14 illustrates a configuration of the PVS 1200 according to embodiments of the present disclosure.

The PVS 1200 according to the disclosure may include a controller 1202 configured to control the overall operation of the PVS 1200, a network interface 1201 including a transmitter and a receiver, and a memory 1203. The disclosure is not limited to the above example, and the PVS 1200 may include more or fewer configurations than the configurations shown in FIG. 14.

According to the disclosure, the network interface 1201 may transmit or receive a signal to or from at least one of other network entities 200, 300, 400, 500, 550, 600, 700, 800, 900, 1000, 1100, 1300, 1400, 1500, 1600, and 1700 or the UE 100. A signal transmitted to or received from at least one of the other network entities 200, 300, 400, 500, 550, 600, 700, 800, 900, 1000, 1100, 1300, 1400, 1500, 1600, and 1700 or the UE 100 may include control information and data.

According to the disclosure, the controller 1202 may control the PVS 1200 to perform the operations of FIGS. 3 to 6 described above. The controller 1202, the memory 1203, and the network interface 1201 are not required to be necessarily implemented as separate modules, and may be implemented as one component in the form of a single chip. In addition, the controller 1202 and the network interface 1201 may be electrically connected to each other. In addition, the controller 1202 may be an application processor (AP), a communication processor (CP), a circuit, an application-specific circuit, or at least one processor.

According to the disclosure, the memory 1203 may store data, such as a basic program, an application program, and configuration information, for the operation of an EIR server 1400. In particular, the memory 1203 provides the stored data according to a request of the controller 1202. The memory 1203 may be configured by a storage medium such as a ROM, a RAM, a hard disk, a CD-ROM, and a DVD, or a combination of storage mediums. In addition, there may be a plurality of memories 1203. In addition, the controller 1202 may perform the above-described embodiments, based on a program for performing the above-described embodiments of the disclosure, the program being stored in the memory 1203.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a security anchor function (SEAF) in a communication network, the method comprising:
- receiving, from a terminal, a non-access stratum (NAS) message including a subscription concealed identifier (SUCI) of the terminal;
- transmitting, to an authentication server function (AUSF), a first request message for an authentication of the terminal, the first request message including the SUCI, a serving network (SN) name, and indicator indicating that the authentication is associated with remote provisioning of subscription owner—standalone non public network (SO-SNPN) via control plane;
- receiving, from the AUSF, a first response message including a subscription permanent identifier (SUPI) of the terminal de-concealed from the SUCI; and
- transmitting, to a provisioning server (PVS) of the SO-SNPN, a message for requesting configuration information for the remote provisioning based on the first response message.

2. The method of claim 1,
- wherein the SUPI, the SN name, and the indicator are transmitted for the authentication of the terminal, from the AUSF to a default credential server (DCS),
- wherein a result of the authentication is transmitted from the DCS to the AUSF, and
- wherein the first response message further includes the result of the authentication.

3. The method of claim 1,
- wherein the SEAF is connected to an access and mobility management function (AMF),
- wherein a subscriber data management (SDM) notification message including information on updated parameter for the terminal is transmitted from a unified data management (UDM) to the AMF,
- wherein the information on the updated parameter for the remote provisioning is transmitted from the AMF to the terminal,
- wherein the updated parameter for the terminal is updated based on the configuration information for the remote provisioning transmitted from the PVS to the UDM, and
- wherein the configuration information for the remote provisioning includes credential information for the SO-SNPN and access information for accessing the SO-SNPN.

4. A method of an authentication server function (AUSF) in a communication network, the method comprising:
- receiving, from a security anchor function (SEAF), a first request message for an authentication of a terminal, the first request message including a subscription concealed identifier (SUCI), a serving network (SN) name, and indicator indicating that the authentication is associated with remote provisioning of subscription owner—standalone non public network (SO-SNPN) via control plane;
- transmitting, to a unified data management (UDM), a second request message for the authentication including the SUCI, the SN name, and the indicator;
- receiving, from the UDM, a second response message including a subscription permanent identifier (SUPI) of the terminal de-concealed from the SUCI; and
- transmitting, to the SEAF, a first response message including the SUPI,
- wherein a message for requesting configuration information for the remote provisioning is transmitted from the SEAF to a provisioning server (PVS) of the SO-SNPN, based on the first response message.

5. The method of claim 4,
- wherein the SUPI is de-concealed from the SUCI by the UDM.

6. The method of claim 4, further comprising:
- transmitting, to a default credential server (DCS), a third request message for the authentication including the SUPI, the SN name, and the indicator; and
- receiving, from the DCS, a third response message including the SUPI and a result of the authentication,
- wherein the first response message further includes the result of the authentication.

7. The method of claim 6,
- wherein the SUPI, the SN name, and the indicator are transmitted from the DCS to the PVS, based on the result of the authentication.

8. The method of claim 4,
- wherein the SEAF is connected to an access and mobility management function (AMF), wherein a subscriber data management (SDM) notification message including information on updated parameter for the terminal is transmitted from a unified data management (UDM) to the AMF, wherein the information on the updated parameter for the remote provisioning is transmitted from the AMF to the terminal, wherein the updated parameter for the terminal is updated based on the configuration information for the remote provisioning transmitted from the PVS to the UDM, and wherein the configuration information for the remote provisioning includes credential information for the SO-SNPN and access information for accessing the SO-SNPN.

9. A security anchor function (SEAF) in a communication network, the SEAF comprising:

a transceiver;

a processor coupled to the transceiver; and memory coupled to the processor and storing instructions executable by the processor to cause the SEAF to:

receive, from a terminal, a non-access stratum (NAS) message including a subscription concealed identifier (SUCI) of the terminal, transmit, to an authentication server function (AUSF), a first request message for an authentication of the terminal, the first request message including the SUCI, a serving network (SN) name, and indicator indicating that the authentication is associated with remote provisioning of subscription owner-standalone non public network (SO-SNPN) via control plane, receive, from the AUSF, a first response message including a subscription permanent identifier (SUPI) of the terminal de-concealed from the SUCI, and transmit, to a provisioning server (PVS) of the SO-SNPN, a message for requesting configuration information for the remote provisioning based on the first response message.

10. The SEAF of claim 9, wherein the SUPI, the SN name, and the indicator are transmitted for the authentication of the terminal, from the AUSF to a default credential server (DCS), wherein a result of the authentication is transmitted from the DCS to the AUSF, and wherein the first response message further includes the result of the authentication.

11. The SEAF of claim 9, wherein the SEAF is connected to an access and mobility management function (AMF), wherein a subscriber data management (SDM) notification message including information on updated parameter for the terminal is transmitted from a unified data management (UDM) to the AMF, wherein the information on the updated parameter for the remote provisioning is transmitted from the AMF to the terminal, wherein the updated parameter for the terminal is updated based on the configuration information for the remote provisioning transmitted from the PVS to the UDM, and wherein the configuration information for the remote provisioning includes credential information for the SO-SNPN and access information for accessing the SO-SNPN.

12. An authentication server function (AUSF) in a communication network, the AUSF comprising:

a transceiver;

a processor coupled to the transceiver; and memory coupled to the processor and storing instructions executable by the processor to cause the AUSF to:

receive, from a security anchor function (SEAF), a first request message for an authentication of a terminal, the first request message including a subscription concealed identifier (SUCI), a serving network (SN) name, and indicator indicating that the authentication is associated with remote provisioning of subscription owner—standalone non public network (SO-SNPN) via control plane, transmit, to a unified data management (UDM), a second request message for the authentication including the SUCI, the SN name, and the indicator, receive, from the UDM, a second response message including a subscription permanent identifier (SUPI) of the terminal de-concealed from the SUCI, and transmit, to the SEAF, a first response message including the SUPI, wherein a message for requesting configuration information for the remote provisioning is transmitted from the SEAF to a provisioning server (PVS) of the SO-SNPN, based on the first response message.

13. The AUSF of claim 12, wherein the SUPI is de-concealed from the SUCI by the UDM.

14. The AUSF of claim 12, wherein the instructions further cause the AUSF to:

transmit, to a default credential server (DCS), a third request message for the authentication including the SUPI, the SN name, and the indicator, and receive, from the DCS, a third response message including the SUPI and a result of the authentication, wherein the first response message further includes the result of the authentication.

15. The AUSF of claim 14, wherein the SUPI, the SN name, and the indicator are transmitted from the DCS to the PVS, based on the result of the authentication.

16. The AUSF of claim 12, wherein the SEAF is connected to an access and mobility management function (AMF), wherein a subscriber data management (SDM) notification message including information on updated parameter for the terminal is transmitted from a unified data management (UDM) to the AMF, wherein the information on the updated parameter for the remote provisioning is transmitted from the AMF to the terminal, wherein the updated parameter for the terminal is updated based on the configuration information for the remote provisioning transmitted from the PVS to the UDM, and wherein the configuration information for the remote provisioning includes credential information for the SO-SNPN and access information for accessing the SO-SNPN.

* * * * *